(12) United States Patent
Bumgardner (10) Patent No.: US 9,291,447 B2
(45) Date of Patent: Mar. 22, 2016

(54) METHOD FOR CONTROLLING MOTION OF A COORDINATE MEASURING MACHINE

(71) Applicant: Mitutoyo Corporation, Kanagawa-ken (JP)

(72) Inventor: Jon David Bumgardner, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 96 days.

(21) Appl. No.: 14/327,469

(22) Filed: Jul. 9, 2014

(65) Prior Publication Data

US 2016/0010974 A1 Jan. 14, 2016

(51) Int. Cl.
*G01B 5/008* (2006.01)
*G01B 11/00* (2006.01)

(52) U.S. Cl.
CPC .................... *G01B 11/007* (2013.01)

(58) Field of Classification Search
CPC .... G01B 11/002; G01B 11/007; G01B 11/14; G01B 5/008; G01B 7/008; G01B 7/012
USPC .................................. 33/503, 1 PT
See application file for complete search history.

(56) References Cited

U.S. PATENT DOCUMENTS

| 4,908,951 | A | | 3/1990 | Gurny | |
|---|---|---|---|---|---|
| 5,305,091 | A | * | 4/1994 | Gelbart | G01B 11/002 33/503 |
| 6,057,909 | A | | 5/2000 | Yahav et al. | |
| 6,134,506 | A | * | 10/2000 | Rosenberg | G01B 5/008 33/502 |
| 6,519,860 | B1 | * | 2/2003 | Bieg | G01B 5/008 33/1 PT |
| 6,535,275 | B2 | | 3/2003 | McCaffrey et al. | |
| 6,668,466 | B1 | * | 12/2003 | Bieg | G01B 5/008 33/1 PT |
| 6,856,407 | B2 | | 2/2005 | Knighton et al. | |
| 7,652,275 | B2 | | 1/2010 | Gladnick | |
| 7,874,917 | B2 | | 1/2011 | Marks et al. | |
| 8,438,746 | B2 | | 5/2013 | Usui | |
| 8,902,408 | B2 | * | 12/2014 | Bridges | G01C 15/002 342/118 |
| 2005/0166413 | A1 | * | 8/2005 | Crampton | B25J 13/088 33/503 |
| 2013/0236089 | A1 | | 9/2013 | Litvak et al. | |
| 2014/0104387 | A1 | | 4/2014 | Klusza et al. | |

OTHER PUBLICATIONS

Do et al., "Infrared Range Sensor Array for 3D Sensing in Robotic Applications," International Journal of Advanced Robotic Systems, vol. 10, 2013, 9 pages.
Larry Li, "Time-of-Flight Camera—An Introduction," Texas Instruments, Technical White Paper, SLOA190—Jan. 2014, 10 pages.

* cited by examiner

*Primary Examiner* — Yaritza Guadalupe-McCall
(74) *Attorney, Agent, or Firm* — Seed IP Law Group PLLC (57) ABSTRACT

A method for manually controlling the motion of a coordinate measuring machine (CMM) is disclosed. The method may include providing at least one guide element motion tracking sensor; defining a guide element active tracking volume relative to one of the guide element tracking sensor and a portion of the CMM; placing a guide element in the active motion tracking volume; tracking the position of the guide element; and moving a measurement probe of the CMM in response to the tracked position (e.g., to follow the position changes). The method may further include detecting a tracking motion activation trigger indicator or condition, and operating the CMM to move the measurement probe portion of the CMM according to the tracking motion after the tracking motion activation trigger indicator or condition is detected and according to the condition that the guide element is located in the active tracking volume.

21 Claims, 5 Drawing Sheets

METHOD FOR CONTROLLING MOTION OF A COORDINATE MEASURING MACHINE

TECHNICAL FIELD

The invention relates to metrology systems and, more particularly, to methods for manually controlling the motion of a coordinate measuring machine.

BACKGROUND

Certain metrology systems such as coordinate measurement systems (CMM's) can be utilized to obtain precise measurements of inspected workpieces and may be controlled at least in part by workpiece feature inspection operations that have been programmed on a computer. One exemplary prior art CMM is described in U.S. Pat. No. 8,438,746, which is hereby incorporated by reference in its entirety. As described in the '746 patent, the CMM includes a probe for measuring a workpiece, a movement mechanism for moving the probe, and a controller for controlling the movement mechanism.

A CMM which includes a surface scanning measurement probe is described in U.S. Pat. No. 7,652,275 (the '275 patent), which is hereby incorporated by reference in its entirety. After a scan, a three dimensional profile of the workpiece is provided. In one type of scanning probe, the workpiece is measured by a mechanical contact probe (e.g., a precise miniature ball) scanning along the workpiece surface.

Some CMM's use an optical probe which scans a workpiece without making physical contact with the surface. Optical probes may be of a type which may use points of light for detecting surface points (such as triangulation probes), or a type that uses a video camera, wherein the coordinates of geometric elements of the workpiece are determined via image processing software.

A "combined" coordinate measuring machine that uses both optical and mechanical measuring is described in U.S. Pat. No. 4,908,951, which is hereby incorporated herein by reference in its entirety.

In various applications, a position of a measurement probe of a CMM (e.g., a tip of a stylus) may be controlled by operations on a computer display user interface or a separate set of joysticks or a hand wheel. It may be difficult or unintuitive for a user to understand the user interface and/or precisely move the measurement point while avoiding unwanted and dangerous collisions of hardware and workpiece components, especially if the user is inexperienced. It is therefore desirable to configure a CMM such that a user may manually move the measurement probe in an easy and intuitive manner.

DETAILED DESCRIPTION

Figure 1:
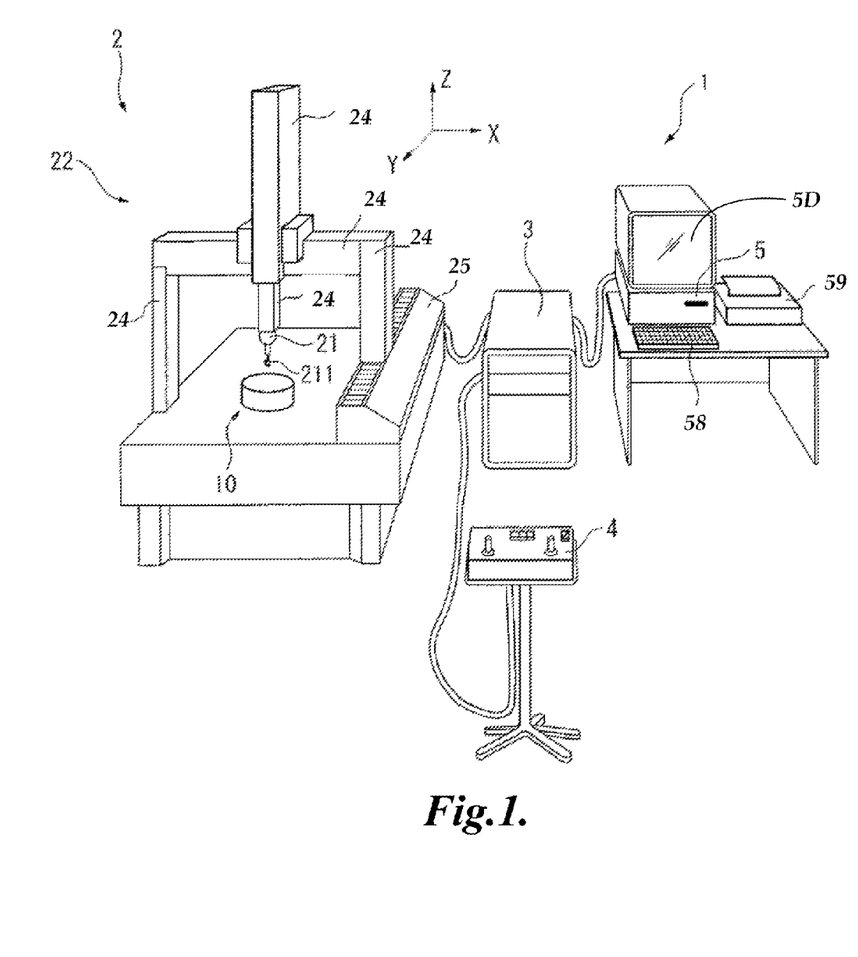
FIG. 1 is a diagram showing various typical components of a metrology system comprising a coordinate measuring machine usable in conjunction with the invention disclosed herein.

FIG. 1 is a diagram showing various typical components of a metrology system 1 including a generic coordinate measuring machine, which provides one context for application of the principles disclosed herein. Certain aspects of the metrology system 1 are further described in the '746 patent. The metrology system 1 may include: a coordinate measuring machine body 2; a motion controller 3 that controls a drive of the coordinate measuring machine body 2; an operating unit 4 for manually operating the coordinate measuring machine body 2; and a host computer 5 that issues commands to the motion controller 3 and executes processing such as shape analysis of a workpiece 10 (an object to be measured) disposed on the coordinate measuring machine body 2. A representative input unit 58 and output unit 59 are connected to the host computer 5, as is a display unit 5D.

The coordinate measuring machine body 2 includes: a measurement probe 21 having a stylus 211 which may contact a surface of the workpiece 10; a movement mechanism 22 that includes a three axis slide mechanism 24 that holds the base end of the measurement probe 21; and a drive mechanism 25 that drives the slide mechanism 24.

Figure 2:
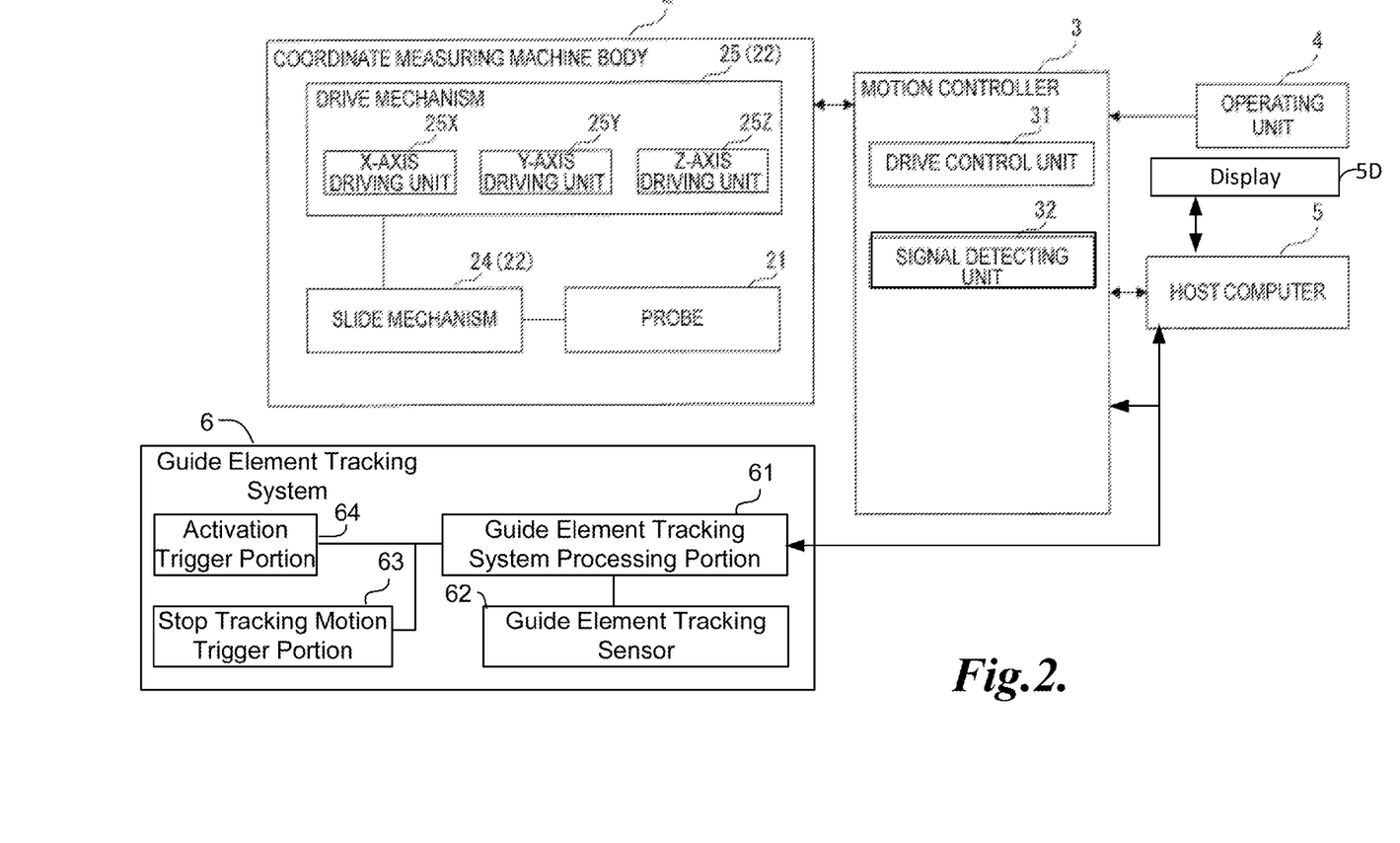
FIG. 2 is a block diagram showing the machine body, motion controller, operating unit, and host computer of the metrology system of FIG. 1, including a guide element tracking system which is configured to provide motion control signals according to manual guide element tracking principles disclosed herein.

FIG. 2 is a block diagram showing the machine body 2, motion controller 3, operating unit 4, and host computer 5 of the metrology system 1 of FIG. 1, including a guide element tracking system 6 which is configured to provide motion control signals according to manual guide element tracking principles disclosed herein. As shown in FIGS. 1 and 2, the drive mechanism 25 includes axis driving units 25Y, 25X and 25Z that slides the components of the slide mechanism in three dimensions. Though not illustrated, the drive mechanism 25 is provided with a plurality of sensors outputting signals in accordance with the displacement of the slide mechanism 24.

As shown in FIG. 2, the motion controller 3 is provided with: a drive control unit 31 that acts on command from the operating unit 4, host computer 5, or the guide element tracking system 6; and a signal detecting unit 32 that detects the signal outputted by the sensors provided on the drive mechanism 25 to detect the three-dimensional displacement and output it to the host computer 5 to indicate the displacement or position of the stylus 211 of the measurement probe 21.

The host computer 5 may include a CPU (Central Processing Unit), a memory, and other known elements. In various implementations, the metrology system 1 includes suitable unitary or distributed computing systems or devices, which may include one or more processors that execute software to perform the functions described herein. Processors include programmable general-purpose or special-purpose microprocessors, programmable controllers, application specific integrated circuits (ASICs), programmable logic devices (PLDs), and the like, or a combination of such devices. Software may be stored in memory, such as random access memory (RAM), read-only memory (ROM), flash memory, and the like, or a combination of such components. Software may also be stored in one or more storage devices, such as disk drives, solid-state memories, or any other medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and accessed via service calls.

During automatic program operation, the host computer 5 outputs a predetermined command to the motion controller 3 to control the coordinate measuring machine body 2 to move the stylus 211 of the measurement probe 21 along a sampling path to measure the surface of the workpiece 10. As part of a method for programming the workpiece feature inspection operations, a manual control and program creation and editing environment (e.g., including a user interface displayed on the display 5D) may be provided by an editing environment portion on the host computer 5.

During such operations it is often necessary or convenient to manually move the measurement probe 21. For example it may be desirable to move the measurement probe 21 proximate to the next intended measurement location, or out of the way to a home position such that a workpiece may be fixed or repositioned. In prior art systems that use motorized motion control systems, such manual control of the measurement probe position has typically been accomplished through interaction with a user interface such as a graphical user environment on a computer screen, a joystick on a manual control or "teaching pendant", or more recently through a computerized touchscreen tablet or the like. One disadvantage of such user interfaces is that their behavior and/or motion response must be learned by a user. Another disadvantage is that they tend to direct the attention of unskilled users toward the user interface device itself and away from the measurement probe and the workpiece, thus increasing the probability of inappropriate motion and/or collision. The guide element tracking system 6 allows intuitive manual control of the measurement probe 21 and, thus, overcomes these disadvantages.

As shown in FIG. 2 guide element tracking system 6 comprises a guide element tracking system processing portion 61, a guide element tracking sensor 62, a stop tracking motion trigger portion 63, and an activation trigger portion 64. The guide element tracking system 6 is usable to generate signals to manually control the motion of the coordinate measuring machine (CMM) body 2. The guide element tracking sensor 62 may be located on CMM body 2 or the metrology system 1, its frame, or any other operable location, and is configured to provide position sensing of a guide element in a sensing volume. The guide element tracking system processing portion 61 inputs signals from the guide element tracking sensor 62 and is configured to: define a guide element active tracking volume within the sensing volume relative to the guide element tracking sensor 62 or a portion of the CMM body 2; operate the guide element tracking system 6 to sense and track a position of the guide element in the active tracking volume; and provide signals to the motion controller 3 in order to operate the CMM body 2 to move the probe 21 according to a three-dimensional (3D) tracking motion that is responsive to the tracked position of the guide element when a guide element that is manually controlled by a user of the CMM body 2 is inserted into the active tracking volume. The guide element tracking system processing portion 61 is further configured to: operate the CMM body 2 and/or the metrology system 1 to detect a tracking motion activation trigger indicator or condition; and provide the signals to the motion controller 3 in order to operate the CMM body 2 to move the probe 21 according to the tracking motion after the tracking motion activation trigger indicator or condition is detected and according to the condition that the guide element is located in the active tracking volume. An exemplary arrangement of a guide element tracking sensor and an active tracking volume is shown in detail in FIGS. 3A and 3B.

It will be appreciated that in some embodiments, the guide element active tracking volume may be the same as, and defined by, the sensing volume. In some embodiments, the tracking motion activation trigger indicator or condition may comprise the guide element being positioned within the guide element active tracking volume. In some embodiments, the tracking motion activation trigger indicator or condition may comprise the guide element entering an activation trigger volume that is a subset of the guide element active tracking volume. For example, the activation trigger volume may be a smaller centrally located volume within the guide element active tracking volume (e.g., the volume TRIGV, shown in FIG. 3B), such that the tracking motion does not begin until the guide element is centrally located within the guide element active tracking volume with a "buffer region" around it for safely tracking or following at least some amount of displacement of the guide element relative to the guide element active tracking volume. In other embodiments, the tracking motion activation trigger indicator or condition may comprise at least one of a user-controlled sound, a voice command, a user-controlled electromagnetic radiation signal, or a user-controlled electrical signal.

Various known sensor types may be used for the guide element tracking sensor 62. For example, in various embodiments it may comprise at least one of photodetector array, a time of flight (TOF) 3D camera, or a stereoscopic camera configuration, or a combination thereof. In some embodiments, the 3D tracking motion that is responsive to the tracked position of the guide element may comprise moving the probe 21 and/or stylus 211 in approximately the same direction and by approximately the same amount as the tracked position of the guide element changes. In some embodiments, the guide element tracking sensor 62, the probe 21, and/or stylus 211 are mounted in a fixed relationship relative to one another on a 3D moving portion of the metrology system 1, and the 3D tracking motion may comprise moving the 3D moving portion of the metrology system 1 such that the guide element is maintained in an approximately fixed relationship relative to the at least one guide element tracking sensor. In some embodiments, at least part of the guide element active tracking volume may be located within 12 inches of the 3D moving portion of the metrology system 1 (e.g., on the slide mechanism 24, analogous to the manner illustrated). In such a case, a user may conveniently manually control the probe 21 while maintaining the probe 21 in their field of vision. In various embodiments, it may be desirable that the guide element active tracking volume be defined at some distance to provide non-contact control (e.g., for safety and/or convenience). Nevertheless, in some embodiments, a switch or button operated by touch may be located on the CMM body 2 proximate a guide element active tracking volume, and may be used to provide the tracking motion activation trigger indicator or condition.

The guide element tracking sensor 62 and various operations of the guide element tracking system processing portion 61 (e.g., finger tracking, gesture analysis, and the like), may be provided by known sensors and/or processing methods implemented in combination according to this disclosure. For example, some exemplary guide element tracking sensors which may be configured and operated by routines for use with a CMM according to the principles described herein are disclosed in U.S. Pat. Nos. 6,057,909; 6,535,275; 6,856,407; and 7,874,917. Signal processing for such sensors may be adapted according principles disclosed in U.S. Patent Publication Nos. 2013/0236089A1 and 2014/0104387A1, for example. Exemplary structured light sensors are available from Primesense. Exemplary TOF sensors include a Kinect sensor, available from Microsoft of Redmond, Wash., and various sensors available from Texas Instruments of Dallas, Tex. An additional exemplary motion tracking sensor includes a Leap Motion Controller, available from Leap Motion of San Francisco, Calif.

Figure 3A:
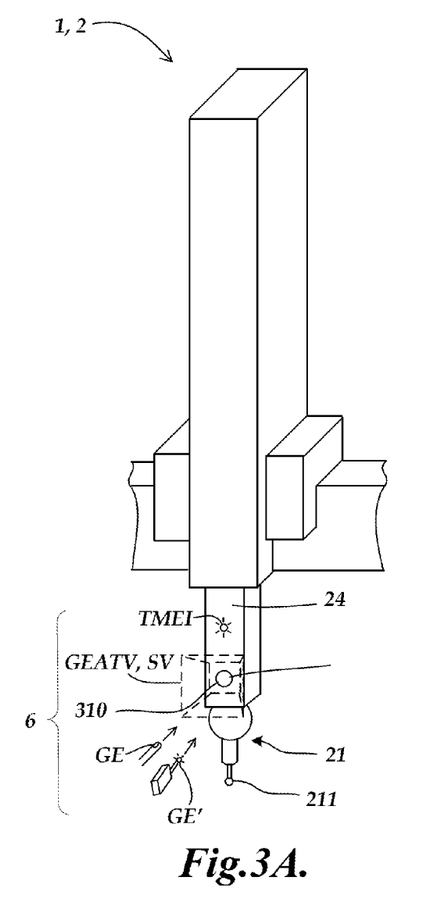
FIGS. 3A and 3B are diagrams showing certain features of one embodiment of the guide element tracking system shown in FIG. 2.

In some embodiments, the guide element may comprise a portion of a user's finger. In some embodiments, the guide element tracking system 6 may be configured to sense more than one finger, and the metrology system 1 may be operated to detect a user gesture comprising a relationship of two or more user fingers in the sensing volume to perform an operation or command based on the detection of the user gesture. In some embodiments, a photoelectric sensor may be configured to track infrared illumination from the guide element. This may be advantageous when tracking a finger or hand of a user and may allow a guide element tracking sensor 310 to filter out ambient light and other noise within the guide element active tracking volume GEATV.

In some embodiments, the metrology system 1 may be operated to detect a stop-tracking-motion indicator or condition, and to deactivate the tracking motion of the probe 21 in response to detecting the stop-tracking-motion indicator or condition. In some embodiments, the stop tracking motion indicator or condition may comprise the guide element moving out of the guide element active tracking volume. In some embodiments, the stop tracking motion indicator or condition may comprise a velocity or acceleration of the guide element exceeding a threshold value (and/or along a certain direction, if desired) inside the guide element active tracking volume.

In some embodiments, the guide element may comprise a portion of a user's finger, the guide element tracking system 6 may be configured to sense more than one finger, and the stop tracking motion indicator or condition may comprise a user gesture comprising a relationship of two or more user fingers in the sensing volume. In some embodiments, the stop tracking motion indicator or condition may comprise at least one of a user-controlled sound, a voice command, a user-controlled electromagnetic radiation signal, or a user-controlled electrical signal.

It will be appreciated that although the guide element tracking system processing portion 61 and the host computer 5 are shown as separate elements in FIG. 2, in various embodiments the host computer 5 may be programmed to provide some or all of the operations and routines outlined herein for the guide element tracking system processing portion 61, and the two elements may thus be merged and/or indistinguishable.

Figure 3B:
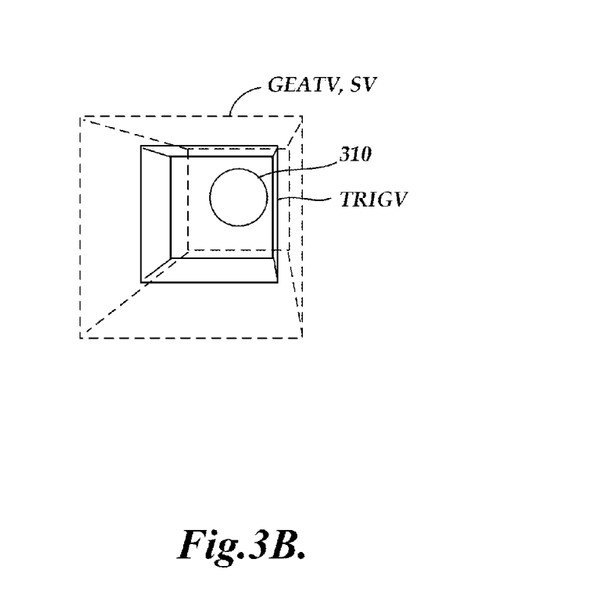

FIGS. 3A and 3B are diagrams showing certain features of one embodiment of the guide element tracking system 6 shown in FIG. 2, along with various components of the metrology system 1 comprising a coordinate measuring machine 2 (e.g., similar to those elements described with reference to FIG. 1), which is configured to operate according to guide element motion tracking principles disclosed herein. The elements of the guide element tracking system 6 shown in FIG. 3A include a guide element motion tracking sensor 310 (also called a guide element tracking sensor) which provides a sensing volume SV which is used to provide a guide element active tracking volume GEATV.

A passive guide element GE (e.g., a finger or fingertip) or an active guide element GE' (e.g., a handheld wand including a radiation source) may be inserted by a user into the guide element active tracking volume GEATV. The position of the guide element may then be tracked by the guide element tracking sensor 310 (e.g., according to known methods) in order to provide motion control signals to move the measurement probe 21 corresponding to the guide element motion, as outlined above and described in greater detail below.

In various embodiments, the motion control signals provided by the guide element tracking system 6 to the motion controller may provide a 3D tracking motion that moves the measurement probe portion in approximately the same direction and by approximately the same amount as the tracked position changes of the guide element. In various embodiments, the guide element active tracking volume GEATV is defined in a fixed relationship relative to a portion of the CMM and/or to the measurement probe. When the guide element tracking sensor 310 and the measurement probe 21 are mounted in a fixed relationship relative to one another on a 3D moving portion of the CMM (e.g., the slide mechanism 24), the 3D tracking motion may comprises moving the 3D moving portion of the CMM such that the guide element is maintained in an approximately fixed relationship relative to the at least one guide element tracking sensor and/or the guide element active tracking volume GEATV. This allows a particularly simple and efficient embodiment for implementing manual motion control as disclosed herein. However, this embodiment is exemplary only, and not limiting.

In some embodiments, the metrology system 1 may comprise a tracking motion enabled indicator (see element TMEI, shown in FIG. 3A), and the tracking motion enabled indicator may be activated when the tracking motion activation trigger indicator or condition is detected, as a notification or confirmation to the user. In various embodiments, an audible and/or visual alert may indicate that an active tracking mode is enabled.

As previously outlined, in some embodiments the tracking motion activation trigger indicator or condition may simply comprise the guide element entering an activation trigger volume that is a subset of the guide element active tracking volume (e.g., the volume TRIGV, shown in FIG. 3B). In such a case, the tracking motion need not begin until the guide element is centrally located within the guide element active tracking volume with a "buffer region" around it for safely tracking displacement of the guide element relative to the guide element active tracking volume.

Figure 4:
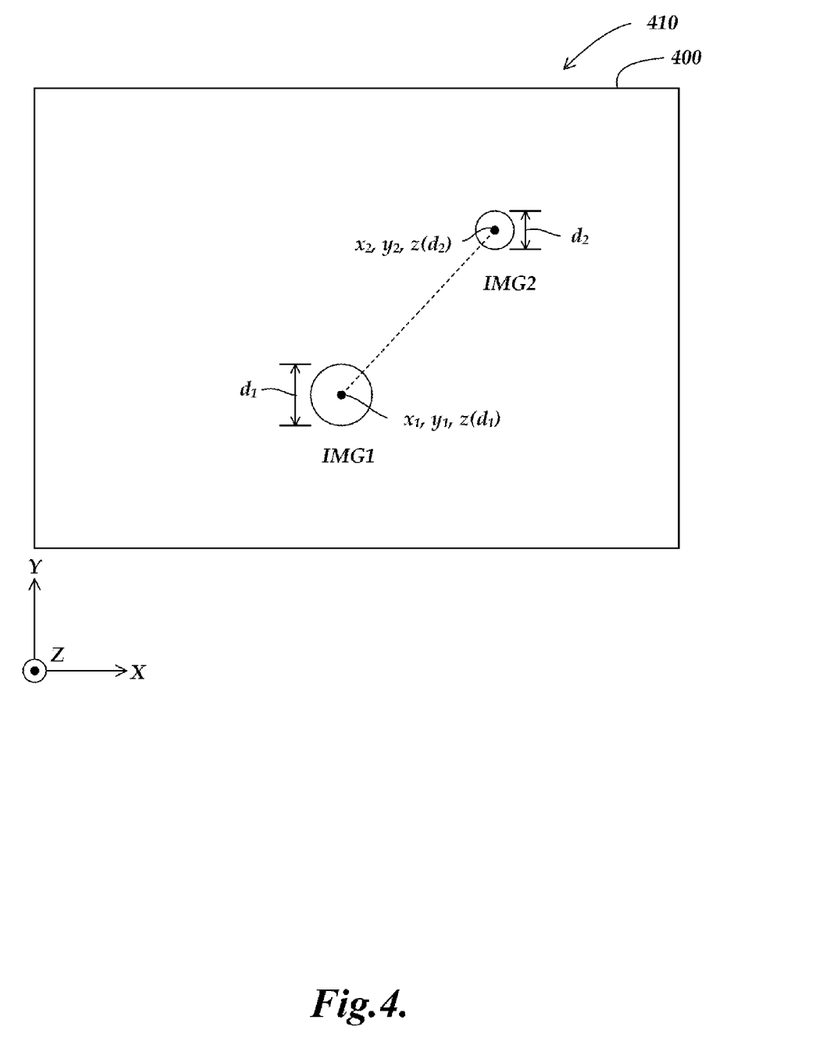
FIG. 4 is a diagram of a field of view of one embodiment of a guide element motion tracking sensor usable according to principles disclosed herein.

FIG. 4 is a diagram of a field of view 400 of one embodiment of a guide element motion tracking sensor 410 usable in a CMM system configured according to principles disclosed herein. In various embodiments, the guide element tracking sensor 410 is a multi-element 3D range sensor comprising a structured light camera system, a stereoscopic camera system, a TOF camera systems, or a 2D sensor including processing (e.g., region size or regional autofocus, or the like) to determine a third dimension for a defined region (e.g., a tracked fingertip, or radiation emitter, or the like). More generally, any sensing system usable to fulfill the principles outlined and claimed herein may be used. In any case, the guide element tracking sensor 410 is configured to detect 3D motion of at least one guide element within a guide element active motion tracking volume, as outlined above.

The field of view 400 shows a first image portion IMG1 which corresponds to a guide element. In the illustrated embodiment, the position of a guide element within the field of view (e.g., its centroid) is indicative of lateral coordinates $x_1$ and $y_1$ of the guide element within an active motion tracking volume. In one exemplary embodiment, the diameter d1 of the first image segment IMG1 is indicative of the z position $z(d_1)$ of the guide element. In alternative embodiments, the z position may be determined from techniques such as triangulation or other range sensing methods, as outlined above.

The field of view 400 additionally shows a second image segment IMG2 which corresponds to the guide element. The guide element corresponding to the image segment IMG2 is determined to be at a position $(x_2, y_2, z(d_2))$ within the active motion tracking volume. A diameter $d_2$ of the image segment IMG2 is smaller than $d_1$, indicating that the guide element is at a z position which is farther away from the guide element tracking sensor 410 than the z position $z(d_1)$ indicated by the image segment IMG1. A guide element tracking system may be configured to move a measurement probe (e.g., by providing motion control or motion control "error" signals) in response to the tracked position or motion of the guide element, as outlined above. In the illustrated embodiment, the CMM may continuously move in order to re-center image segment IMG1 (and/or IMG2) while maintaining a diameter of the image segment IMG1 (and/or IMG2) corresponding to the center of the active motion tracking volume. Alternative sensors and methods of guide element recognition and tracking have been outlined above. It will be appreciated that various known types of sensors and/or processing may be used to provide a tracking motion configured such that the guide element remains approximately in the center of the guide element active tracking volume, if desired.

Figure 5:
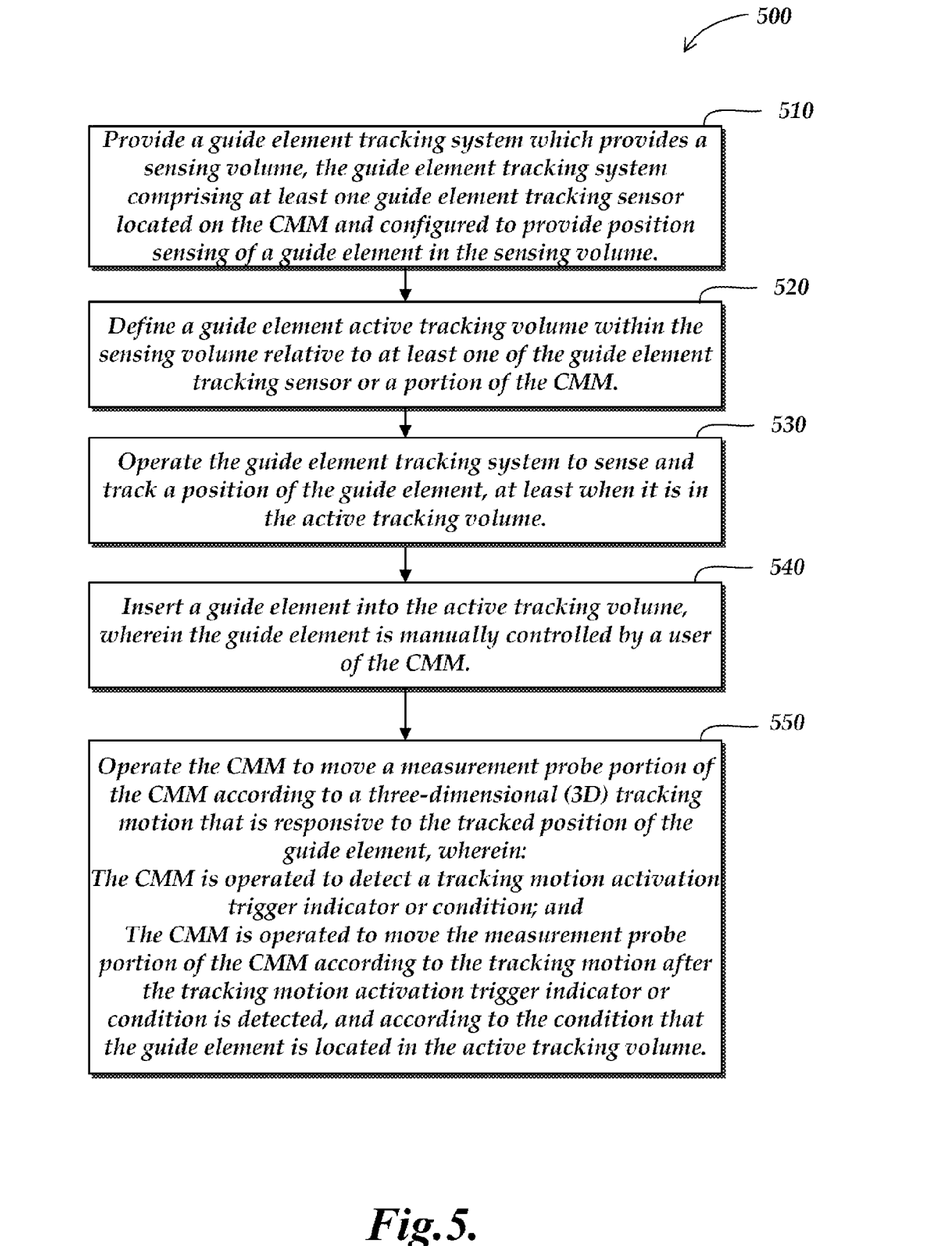
FIG. 5 is a flow diagram showing one embodiment of a method or routine for controlling the motion of a coordinate measuring machine according to principles disclosed herein.

FIG. 5 is a flow diagram 500 showing one embodiment of a method or routine for controlling the motion of a coordinate measuring machine according to principles disclosed herein.

At block 510, a guide element tracking system is provided which provides a sensing volume, the guide element tracking system comprising at least one guide element tracking sensor located on the CMM and configured to provide position sensing of a guide element in the sensing volume.

At block 520, a guide element active tracking volume is defined within the sensing volume relative to at least one of the guide element tracking sensor or a portion of the CMM. As outlined previously, in one embodiment the guide element active tracking volume may be the same as, and/or defined by, the sensing volume. In various embodiments, the guide element active tracking volume provides a position sensing coordinate system that is fixed relative to at least one of the guide element tracking sensor or a portion of the CMM. In one embodiment, it may be fixed relative to the portion of the CMM carrying the CMM measurement probe.

At block 530, the guide element tracking system is operated to sense and track a position of the guide element, at least when it is in the active tracking volume. Various methods for sensing and tracking the position of the guide element have been outlined above with reference to FIG. 2. However, it will be appreciated that such methods are exemplary only and not limiting. More generally, any applicable method of sensing and tracking the position of the guide element may be used At block 540, a guide element is inserted into the active tracking volume, wherein the guide element is manually controlled by a user of the CMM. In one exemplary embodiment, the guide element is advantageously simply one or more fingertips of the user. In other embodiments, the guide element may be an element included on a handheld wand, or the like. In some such embodiments, the guide element may emit controllable electromagnetic radiation, and/or provide various control signals in addition to having its position sensed.

At block 550, the CMM is operated to move a measurement probe portion of the CMM according to a three-dimensional (3D) tracking motion that is responsive to the tracked position of the guide element, under prescribed conditions: The CMM is operated to detect a tracking motion activation trigger indicator or condition. The CMM is operated to move the measurement probe portion of the CMM according to the tracking motion after the tracking motion activation trigger indicator or condition is detected, and according to the condition that the guide element is located in the active tracking volume.

Among the various alternatives outlined previously, in one embodiment the tracking motion activation trigger indicator or condition may simply comprise or consist of the guide element being positioned within the guide element active tracking volume. In one embodiment, the tracking motion activation trigger indicator or condition may advantageously comprise the guide element entering an activation trigger volume that is a subset of the guide element active tracking volume (e.g., a centrally located subset of the active tracking volume. In various embodiments, it is advantageous and intuitive if the 3D tracking motion that is responsive to the tracked position of the guide element comprises moving the measurement probe portion in approximately the same direction and by approximately the same amount as the tracked position of the guide element changes. In such a case, the measurement probe may be guided in a noncontact manner, and may simply track (e.g., move in parallel with) the guide element (e.g., the user's fingertip) as it is moved in the guide element active tracking volume.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The embodiments of the invention in which an exclusive property or privilege is claimed are defined as follows:

1. A method for controlling motion of a coordinate measuring machine (CMM), the method comprising:
    providing a guide element tracking system which provides a sensing volume, the guide element tracking system comprising at least one guide element tracking sensor located on the CMM and configured to provide position sensing of a guide element in the sensing volume;
    defining a guide element active tracking volume within the sensing volume relative to at least one of the guide element tracking sensor or a portion of the CMM;
    inserting a guide element into the active tracking volume, wherein the guide element is manually controlled by a user of the CMM;
    operating the guide element tracking system to sense and track a position of the guide element in the active tracking volume; and
    moving a measurement probe portion of the CMM according to a three-dimensional (3D) tracking motion that is responsive to the tracked position of the guide element,
    wherein the method further comprises:
        operating the CMM to detect a tracking motion activation trigger indicator or condition; and
        operating the CMM to move the measurement probe portion of the CMM according to the tracking motion after the tracking motion activation trigger indicator or condition is detected and according to the condition that the guide element is located in the active tracking volume.

2. The method of claim 1, wherein the method further comprises operating the CMM to detect a stop-tracking-motion indicator or condition, and to deactivate the tracking motion of the measurement probe portion in response to detecting the stop-tracking-motion indicator or condition.

3. The method of claim 2, wherein the stop tracking motion indicator or condition comprises the guide element moving out of the guide element active tracking volume.

4. The method of claim 2, wherein the stop tracking motion indicator or condition comprises a velocity or acceleration of the guide element exceeding a threshold value inside the guide element active tracking volume.

5. The method of claim 2, wherein the guide element comprises a portion of a user's finger, the guide element tracking system is configured to sense more than one finger, and the stop tracking motion indicator or condition comprises a user gesture comprising a relationship of two or more user fingers in the sensing volume.

6. The method of claim 2, wherein the stop tracking motion indicator or condition comprises at least one of a user-controlled sound, a voice command, a user-controlled electromagnetic radiation signal, or a user-controlled electrical signal.

7. The method of claim 1, wherein the CMM comprises a tracking motion enabled indicator and the method further comprises activating the tracking motion enabled indicator when the tracking motion activation trigger indicator or condition is detected.

8. The method of claim 1, wherein the tracking motion activation trigger indicator or condition comprises the guide element being positioned within the guide element active tracking volume.

9. The method of claim 8, wherein the tracking motion activation trigger indicator or condition is comprises the guide element entering an activation trigger volume that is a subset of the guide element active tracking volume.

10. The method of claim 1, wherein the tracking motion activation trigger indicator or condition comprises at least one of a user-controlled sound, a voice command, a user-controlled electromagnetic radiation signal, or a user-controlled electrical signal.

11. The method of claim 1, wherein the at least one guide element tracking sensor comprises at least one of photodetector array, a time of flight (TOF) 3D camera, and a stereoscopic camera configuration.

12. The method of claim 1, wherein the at least one guide element tracking sensor comprises a time of flight (TOF) 3D camera.

13. The method of claim 1, wherein the 3D tracking motion that is responsive to the tracked position of the guide element comprises moving the measurement probe portion in approximately a same direction and by approximately a same amount as tracked position changes of the guide element.

14. The method of claim 13, wherein the at least one guide element tracking sensor and the measurement probe portion are mounted in a fixed relationship relative to one another on a 3D moving portion of the CMM, and the 3D tracking motion comprises moving that 3D moving portion of the CMM such that the guide element is maintained in an approximately fixed relationship relative to the at least one guide element tracking sensor.

15. The method of claim 14, wherein at least part of the guide element active tracking volume is located within 12 inches of that 3D moving portion of the CMM.

16. The method of claim 1, wherein the guide element comprises a portion of a user's finger.

17. The method of claim 15, wherein the guide element tracking system is configured to sense more than one finger, and the method further comprises operating the CMM to detect a user gesture comprising a relationship of two or more user fingers in the sensing volume perform an operation or command based on the detection of the user gesture.

18. The method of claim 1, wherein the guide element active tracking volume and the sensing volume are the same.

19. A guide element tracking system for use in a coordinate measuring machine (CMM), the guide element tracking system usable to generate signals to manually control motion of the a coordinate measuring machine (CMM), the guide element tracking system comprising:
at least one guide element tracking sensor located on the CMM and configured to provide position sensing of a guide element in a sensing volume; and
a guide element tracking system processing portion which inputs signals from the at least one guide element tracking sensor and is configured to:
define a guide element active tracking volume within the sensing volume relative to at least one of the guide element tracking sensor or a portion of the CMM,
to operate the guide element tracking system to sense and track a position of the guide element in the active tracking volume, and
provide signals to a motion control portion of a the CMM in order to operate the CMM to move a measurement probe portion of the CMM according to a three-dimensional (3D) tracking motion that is responsive to the tracked position of the guide element, when a guide element that is manually controlled by a user of the CMM is inserted into the active tracking volume;
wherein the guide element tracking system processing portion is further configured to:
operate the CMM to detect a tracking motion activation trigger indicator or condition; and
provide the signals to the motion control portion in order to operate the CMM to move the measurement probe portion of the CMM according to the tracking motion after the tracking motion activation trigger indicator or condition is detected and according to the condition that the guide element is located in the active tracking volume.

20. The guide element tracking system of claim 19, wherein:
the tracking motion activation trigger indicator or condition comprises the guide element being positioned within the guide element active tracking volume; and
the 3D tracking motion that is responsive to the tracked position of the guide element comprises moving the measurement probe portion in approximately a same direction and by approximately a same amount as tracked position changes of the guide element.

21. The guide element tracking system of claim 20, wherein the at least one guide element tracking sensor comprises at least one of photodetector array, a time of flight (TOF) 3D camera, and a stereoscopic camera configuration, and the guide element comprises a portion of a user's finger.

\* \* \* \* \*